United States Patent

Kodama et al.

[11] 3,830,117
[45] Aug. 20, 1974

[54] TRANSMISSION FOR AUTOMATICALLY CHANGING A GEAR RATIO

[75] Inventors: Masayuki Kodama; Nobuo Narumi, both of Tokyo, Japan

[73] Assignee: Fuji Heavy Industries, Ltd., Tokyo, Japan

[22] Filed: Aug. 23, 1972

[21] Appl. No.: 283,007

[52] U.S. Cl. ................................. 74/763, 74/753
[51] Int. Cl. ..................... F16h 57/10, F16h 3/58
[58] Field of Search ..................... 74/763, 753, 770

[56] References Cited
UNITED STATES PATENTS

| 902,856 | 11/1908 | Cave ................................. 74/763 X |
| 1,541,168 | 6/1925 | Nambotin ........................... 74/763 |
| 1,883,500 | 10/1932 | Bjorndal et al. ..................... 74/763 |
| 1,991,124 | 2/1935 | Sharpe .............................. 74/763 X |
| 2,303,975 | 12/1942 | Banker .............................. 74/763 X |
| 2,549,125 | 4/1951 | Paton ............................... 74/763 X |
| 2,576,336 | 11/1951 | Farkas .............................. 74/763 X |
| 2,603,109 | 7/1952 | Farkas et al. ....................... 74/763 X |
| 2,771,793 | 11/1956 | Robbins ............................. 74/753 |
| 3,482,469 | 12/1969 | Mori ................................ 74/763 X |

FOREIGN PATENTS OR APPLICATIONS 618,934  9/1935  Germany ............................ 74/763

Primary Examiner—Samuel Scott
Assistant Examiner—P. S. Lall
Attorney, Agent, or Firm—Sughrue, Rothwell, Mion, Zinn & Macpeak

[57] ABSTRACT

A transmission for automatically changing a gear ratio into three forward gear ratios and one reverse gear ratio which has three planetary sun gears mounted on an input shaft (main shaft), each having different numbers of teeth, planetary pinion groups mounted on said planetary pinion pins (sub shafts) and engaged with the planetary sun gears, respectively, so as to rotate around respective planetary pinion pins, planetary carriers supporting planetary pinion pins and enabling the planetary pinion groups to rotate around an axis of the planetary sun gears, and forward and reverse locking means, wherein the input shaft is connected to a planetary low sun gear while the planetary carriers are locked by the forward locking means to obtain a normal first reduction speed; in the same state as the planetary carriers remain locked, the input shaft is connected to a planetary second sun gear to obtain a normal second reduction speed; by allowing the planetary carriers to rotate, the input shaft is connected to a planetary output sun gear which is connected to an output shaft to obtain the final normal direct-coupling drive; and the input shaft is connected to the planetary low sun gear, at the same time, the planetary second sun gear is locked by the reverse locking means to obtain the reverse reduction speed.

4 Claims, 6 Drawing Figures

TRANSMISSION FOR AUTOMATICALLY CHANGING A GEAR RATIO

BACKGROUND OF THE INVENTION

1. Field of the Invention:

This invention relates to a power transmission mechanism of an automatic transmission for an automobile.

2. Description of the Prior Art:

The conventional planetary gear transmission used in the gear box of the automatic transmission is of Ravigneaux type of the composite type having internal gears or of the Simpson type of the dual row type combined with two simple planetary gears. These have such disadvantages in structure that as it has an internal gear wheel within the arrangement of the gears, the outer diameter thereof becomes large and it is difficult to obtain a small type of the transmission. Speed shifting is obtained by engaging or disengaging simultaneously both the hydraulic brake band (or hydraulic brake clutch) for fixing the stationary element of the planetary gear and the hydraulic clutch for directly connecting two rotary elements as to cover at least one speed range in the forward speed shiftings, and in order to smoothen the shifting it is necessary to provide delicate timing and frictional characteristics between the mutual operations of the engagement (or disengagement) of the brake band and the disengagement (or engagement) of the clutch. A special control mechanism is necessary for its control to engage the complicated structure at the same time as to the brake band. In order to smoothen the speed shifting, it is necessary to correctly adjust the interference of the band, and when the frictional members of the brake band are worn during usage thereof, it must be readjusted. In order to lessen the irregularity of the shock generated upon speed shifting of the transmission, strict uniformity is necessary for the brake characteristic upon operation.

Another disadvantage of the planetary gear device for the conventional automatic transmission, is that the brake band (or brake clutch) and the direct-coupling clutch used for the speed shifting means are operated by a hydraulic servo mechanism, and the structure is enlarged due to this servo mechanism and the frictional elements. At the same time, as the number of the brake bands and the clutch elements increases, excessive power is necessary for driving the oil pump as the hydraulic source for operating them. This increases internal power loss of the transmission to the detriment of the efficiency.

Automatic transmissions have been constructed utilizing there pure planetary gears, there with the general manual transmission of simple structure as a base.

In principle, these transmissions use an hydraulic clutch instead of the synchromesh mechanism of the manual transmission, and the structure is somewhat simplified. But it has disadvantages insofar as it acquires an extra clutch for shifting the speed in comparison with the conventional planetary gear system. Also it needs an independent gear set for reversing the vehicle in comparison with the planetary gear system. Furthermore, it is necessary to provide a hydraulic clutch instead of the synchromesh mechanism between a pair of gear shafts, and accordingly the distance between the shafts becomes large, and the respective gears become enlarged so as to need a large space.

SUMMARY OF THE INVENTION

It is an object of the present invention to provide an automatic transmission which has a gear box which is automatically changed in multi-stepwise is compact and has a low internal power loss.

It is another object of the present invention to provide an automatic transmission which adopts special planetary gear mechanism in order to be compact in structure and has multi-stage forward and reverse speed shifting ratio.

It is a further object of the present invention to provide an automatic transmission which fixes all the reactions applied to the planetary gear trains by one-way clutch so as to reduce the shock upon automatic shifting of the respective forward speeds, without using special controls.

It is still another object of the present invention to provide an automatic transmission which eliminates the conventional shifting by fixing the reaction elements of the planetary gear device by the operation of the conventional hydraulic brake band or hydraulic brake clutch, by adopting a mechanical lock mechanism to simplify the transmission structure while at the same time reducing the internal power loss of the oil pump as much as possible and thereby preventing the lowering of the efficiency in the transmission.

It is still another object of the present invention to provide an automatic transmission which has a single brake band for the purpose of braking the engine during coasting. The brake bond is not used for shifting control and, therefore, does not need readjustment due to the wear for reducing the adjusting portions of the automatic transmission.

It is still another object of the present invention to provide an automatic transmission which is compact and has less internal loss in the transmission with less shock upon automatic shifting with a simplified speed shifting control system.

According to the present invention, there is provided an automatic transmission which has a planetary gear box, wet type multi-plate clutches, one brake band, and one one-way clutch in forward and reverse power transmission and further two sets of lock mechanisms for mechanically fixing the reaction elements of a planetary gear. In operation of the transmission, the drive force of the transmission is automatically shifted between the 1st, 2nd and 3rd speeds, and forward and reverse are selected manually by the driver of the vehicle. To allow manual control, the transmission has one set of oil pump driven by the engine, and a hydraulic control mechanism operated by the oil applied under pressure from the oil pump.

It is preferred that the automatic transmission of the present invention lie coupled to a fluid torque converter for increasing the torque between the drive and driven shafts of the transmission and for enabling of speed shifting in the power connected.

In the transmission of the present invention, the same speed shifting as the conventional manual transmission is adopted, and in order to automate this, a hydraulic clutch is substituted for the synchromesh mechanism but with it the structure such that the counter gear shaft is rotated around an axis of main shaft and around its own axis while engaging with the opposite gears of the main shaft without fixing the counter gear shaft to the case. This eliminates the necessity of the special clutch upon final speed shifting (direct coupling), at the same time for the reverse speed shifting this gear set is used as a planetary gear device, and their composite rotation provides the reverse travelling without using the gear set independent for the reverse operation.

In such special planetary gear device, the united planetary pinion group corresponding to the counter gear is designed to engage the respective gears at two to four positions equi-spaced around the gears on the main shaft in order to reduce the load bearing of the respective gears and to provide extremely compact gear sets.

The characteristic features of the special planetary gear device differ from the conventional automatic transmission in that the hydraulic brake band or brake clutch is not used for the stationary mechanism for the reaction elements of the planetary gear in the general shifting except during the engine braking. Instead, a simple gear stopper locking mechanism combined with one one-way clutch is adopted, and during forward automatic shifting the locking mechanism is not operated but with only two sets of hydraulic clutch to obtain the three-stage forward speed shiftings. In addition, in the planetary gear speed shifting mechanism of the present invention, the reaction elements of the planetary gear in automatic forward shifting fixes the one-way clutch through the gear stopper locking mechanism, and accordingly omits the timing adjustment and special control mechanism necessary for the conventional planetary gear type automatic transmission in engagement and disengagement of two hdyraulic clutches and accordingly speed shifting is smoothly and ideally.

Since the automatic transmission of the present invention adopts such a gear stopper locking mechanism, in comparison with the hydraulic brake band type (or hydraulic brake clutch type), it does not need to supply hydraulic oil to the servo mechanism, and accordingly it may lessen the oil pump as a hydraulic power source to prevent internal power loss, that is the lowering of the efficiency of the transmission at the same time the servo mechanism is not necessary to enable simplification of the structure and compactness of the size.

The other objects, features and advantages of the present invention will becomes more apparent from the following description taken in conjunction with the accompanying drawings.

DETAILED DESCRIPTION OF THE PREFERRED EMBODIMENT

Reference is now made to the drawings, which show one embodiment of the automatic transmission of the present invention.

Generally, the structure of the automatic transmission is composed mainly of a torque converter section, gear box section and hydraulic control mechanism as three sections.

The torque converter has a pump, turbine and stator as three elements, and one-way clutch contained in the stator. A drive gear of first speed reduction is mounted on the turbine shaft, and the driven gear is mounted on the input shaft of the gear box.

The gear box section has one set of planetary gears as a shifting device, one sets each of front and rear wet type multi-plate clutches of substantially the same specification, one set of gear stopper locking mechanism for forward and reverse respectively fixing the inner race of the one-way clutch mounted to the carrier of the planetary gear device and rear clutch drum, secondary speed reduction gear mounted onto the output shaft of the planetary gear speed shifting device, and a differential device.

The embodiment of the automatic transmission of the present invention will be described with respect to the three forward and one reverse gear ratios provided therein in detail.

Figure 1:
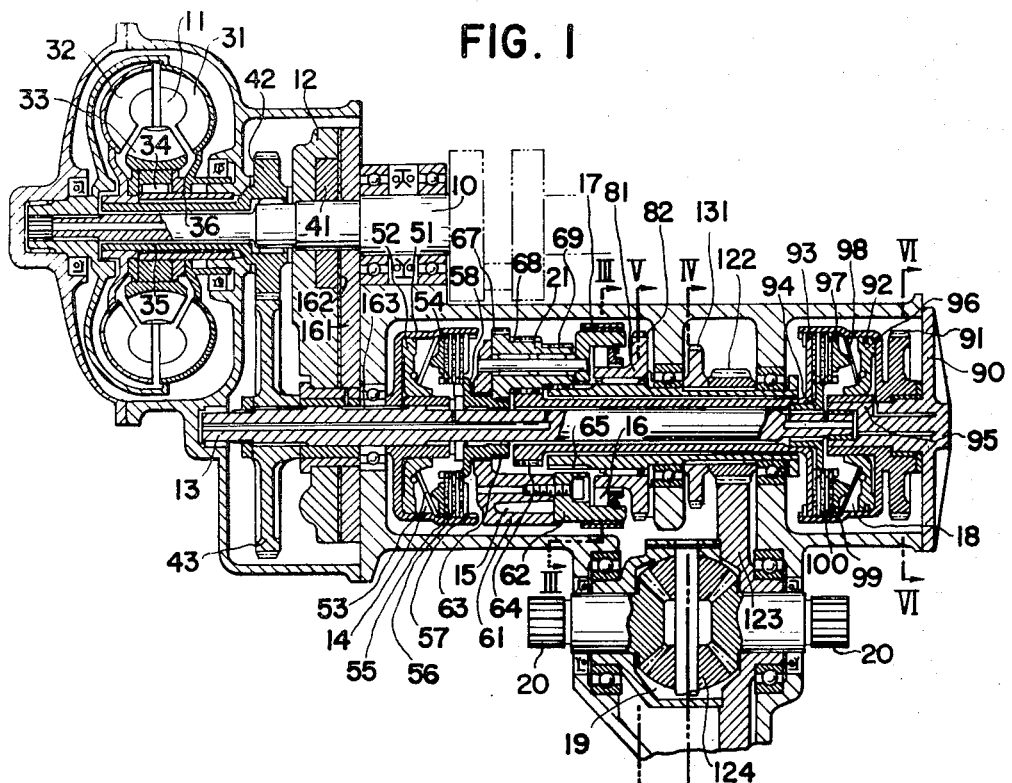
FIG. 1 is a longitudinal sectional view of the automatic transmission constructed according to the present invention.

Referring now to FIG. 1 which shows one embodiment of the automatic transmission of the present invention, a torque converter 11 driven by a prime mover is composed of a pump 31 engaged with a shaft 10 of the prime mover in spline connection, a turbine 32 engaged in spline connection similar to a turbine shaft 35 and a stator 33 engaged with a stator shaft 36 through one-way clutch 34 as three parts. The shaft 10 of the prime mover drives a oil pump 41 provided in the hydraulic control device 12. The turbine shaft 35 is made integrally of a primary speed reduction drive gear 42, and the gear 42 is engaged with a primary speed reduction driven gear 43 engaged in spline connection with a input shaft 13 of the gear box section. The input shaft 13 is engaged in spline connection with a clutch drum 51 of a front clutch 14 and a clutch hub 94 of a rear clutch 18.

The front clutch 14 has a clutch inner plate 55 disposed between a clutch outer plate 56 engaged so as to axially move in the clutch drum 51 therein and so engaged as to axially move with respect to a clutch hub 58, clutch piston 52 set so as to axially move inside of the clutch drum 51, a clutch diaphragm spring 53 for transmitting the thrust generated at the clutch piston 52 when the hydraulic oil is actuated to the front clutch 14 to the clutch plates 55 and 56 and for actuating to return the clutch piston 52 when the front clutch 14 is released, a pressure plate 54 for transmitting the thrust of the clutch piston 52 to the clutch plates 55 and 56 when the load of the clutch diaphragm spring 53 is received, a clutch flange 57 forming the outer wall of the front clutch, etc.

The front clutch hub 58 is composed integrally with a planetary low sun gear 63 for actuating as the input member to a planetary gear speed shifting device 15 in case of first speed and reverse.

Figure 2:
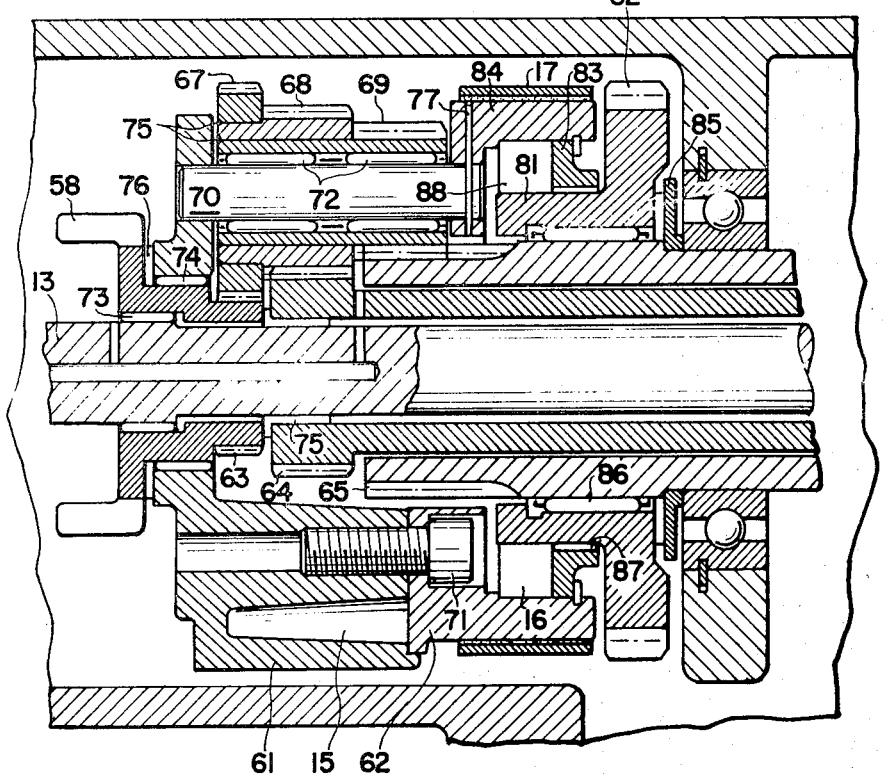
FIG. 2 is a view partly expanded of the transmission shown in FIG. 1.

Reference is now made to FIG. 2, which shows a view partly expanded of the transmission shown in FIG. 1 as to the planetary gear speed shifting device 15 and one-way clutch 16.

The planetary gear speed shifting device 15 has two planetary carriers 61 and 62 integrally acting with each other by being tightened with a socket bolt 71, three planetary sun gears composed of the planetary low sun gear 63, a planetary second sun gear 64 and a planetary output sun gear 65, and integral planetary pinion set 21 including planetary low pinion 67, planetary second pinion 68 and planetary output pinion 69 which are welded in electronic beam welding 75 and coaxially supported on a planetary pinion pin 70 fixed to the planetary carriers 61 and 62 through bearing assembly 72 and the planetary low sun gear 63, the planetary second sun gear 64, and the planetary output sun gear 65 are engaged with the planetary low pinion 67, the planetary second pinion 68 and the planetary output pinion 69, respectively.

The planetary carrier 62 functions as a outer race 84 of an one-way clutch 16, and in order to fix the movement of the planetary pinion pin 70, it is fixed to the outer race 84 of the one-way clutch 16 by a roll pin 77.

The one-way clutch 16 comprises an outer race 84, a spray 88 and, an inner race 81. Flange 83, integrally mounted to the outer race 84, supports the bearing 87.

Figure 3:
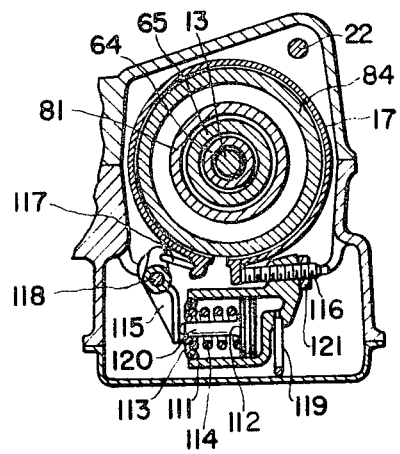
FIG. 3 is a sectional view of the automatic transmission taken along the line III—III in FIG. 1.

A band brake 17 has a mechanism for tightening against the outer periphery of the outer race 84 of the one-way clutch 16, as shown in FIG. 3, which shows part of the automatic transmission along the line III—III in FIG. 1.

A piston 112 is constructed slidably with a cylinder 111 in axial direction of the cylinder 111, and a piston return spring 114 is set between a spring retainer 113 fixed to the cylinder 111, as seen in FIG. 3.

A projection 120 for pushing a band lever 115 is formed integrally with the piston 112, and the band lever 115 moves around a shaft 118 so as to tighten the band through a strut 117.

Figure 4:
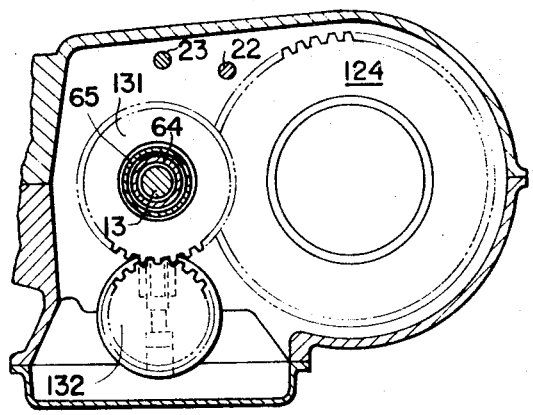
FIG. 4 is a sectional view of the transmission along the line IV—IV in FIG. 1.

The opposite end of the strut 117 of the brake band 17 acts as the anchor of a adjusting screw 116 so that a lock nut 121 locks the adjusting screw 116. A gear 131 fixed to the shaft of the planetary output sun gear 65 by a spline connection is engaged with a gear 132 integrally rotating with the governor valve body, as shown in FIG. 4, which shows the embodiment of the automatic transmission along the line IV—IV in FIG. 1.

Another gear 122 mounted on the shaft of the planetary output sun gear 65 is secondary speed reduction gear, and is engaged with a gear 123 so as to transmit the power to an axle shaft 20 through a differential gear 19.

The planetary second sun gear 64 is so set as to rotate integrally with a clutch flange 93 fixed in spline with a clutch drum 92 of the gear clutch 18, and is integral with the reverse locking gear 91.

The clutch hub 94 is engaged with the input shaft 13 of the transmission in spline connection, and is rotated integrally with a clutch inner plate 99.

A clutch outer plate 100 is engaged with the clutch drum 92 so that the clutch inner plate 99 and the clutch outer plate 100 are alternatively disposed.

The rear clutch 18 is supported by a projection 95 of a transmission cover 90, and has a clutch piston 96, a clutch diaphragm spring 98 and a pressure plate 97.

The hydraulic pressure to the rear clutch 18 is introduced through the transmission cover 90 and its projection 95.

The difference between the front clutch 14 and the rear clutch 18 is that a reverse locking gear 91 is integrally attached to the rear clutch drum 92 and the clutch hub 58 and the clutch flange 57 of the front clutch 14 differ from the clutch hub 94 and the clutch flange 93 of the rear clutch 18, respectively. Otherwise, the same parts of the same performance are used.

Figure 5:
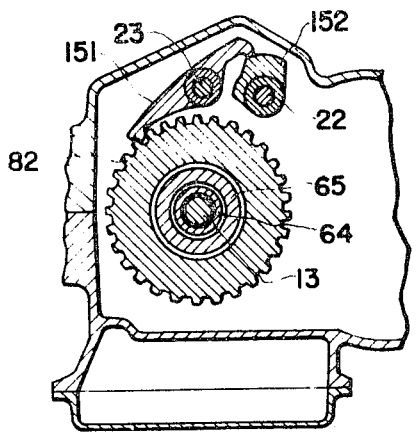
FIG. 5 is a partial sectional view of the transmission along the line V—V in FIG. 1.

FIG. 5 shows the forward locking mechanism of the automatic transmission of the present invention.

A cam 152 moving integrally with a shaft 22 rotating in cooperation with the select lever and link mechanism (not shown) moves a forward locking lever 151 so as to engage or disengage a forward locking gear 82.

In this case, the forward locking lever 151 is always urged onto the cam 152 by the tension of a spring. Thus, the forward locking lever 151 and the locking gear 82 may never engage with each other except when activated by cam 152.

The forward locking lever 151 is set so as to rotate around a shaft 23, and FIG. 5 shows the state that the forward gear train is selected, and it is when "N", "R" and "P" range is selected that the forward locking lever 151 and the locking gear 82 are disengaged.

Figure 6:
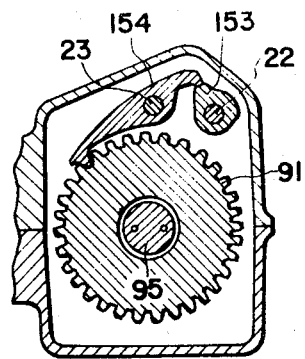
FIG. 6 is a sectional view of the transmission along the line VI—VI in FIG. 1.

FIG. 6 shows the reverse locking mechanism of the automatic transmission of the present invention. It operates with the same shafts 22 and 23 as that of the forward locking mechanism, and a cam 153 may rotate integral with the shaft 22, so as to move a reverse locking lever 154 to disengage the locking mechanism. The reverse locking lever 154 engages the reverse locking gear 91 integral with the rear clutch drum 92, and the reverse locking mechanism operates only when "R" range is selected.

In other forward gear ranges, "N" or "P" range is selected, locking lever 154 becomes disengaged from reverse locking gear 91. FIG. 6 shows the state that "R" is selected.

In operation of thus constructed automatic transmission of the present invention shown in FIG. 1 to FIG. 6, the engine rotates clockwise seen from the torque converter 11 side, and the power of the engine is transmitted from the pump 31 of the torque converter 11 to the turbine 32, passing through turbine shaft 35, primary speed reduction gears 42, 43 to the input shaft 13 of the transmission.

Accordingly, the rotary direction of the input shaft 13 of the transmission is counterclockwise seen from left side of FIG. 1. The transmission shifts through 3 forward speeds when the "D" range is manually selected, the two lower speeds when "2" range is selected, and does not shift out of low gear when the "1" range is selected. The power from the engine is transmitted from the secondary speed reduction gear 122 rotating integral with the planetary output sun gear 65 through the differential device 19 to the axle shaft 20.

The selecting pattern of the automatic transmission of this invention may be of 6 positions such as 1, 2, D, N, R and p. The 1st speed in "D" range is so provided that the forward locking lever 151 and the forward locking gear 82 are engaged with each other by the linkage of the selecting lever, and the inner race 81 of the one-way clutch 16 is fixed. For this reason, the clockwise rotation of the planetary carriers 61 and 62 integral with the outer race 84 of the one-way clutch 16 seen from the primary speed reduction gear side is restricted, but only the counterclockwise rotation is conducted freely. When the engine is started, the planetary carriers 61 and 62 gives a clockwise reaction, and accordingly, the planetary carriers 61 and 62 are fixed by the one-way clutch 16. When it is driven from the axle shaft 20 side, the reaction generated at the planetary carriers 61 and 62 becomes counterclockwise so that the one-way clutch 16 is disengaged. In such state, by operating the front clutch 14, the power from the engine is transmitted from the front clutch drum 51 to the front clutch hub 58 so that the planetary low sun gear 63 integral therewith becomes the input member of the planetary gear device so as to obtain 1st speed.

The front clutch 14 is so operated that the hydraulic pressure is introduced between the clutch drum 51 and the clutch piston 52 from the valve body 12 through a plate 162, an oil distributor 161, and an oil passage 163 provided at the input shaft 13 of the transmission so as to move the clutch piston 52 in the direction that the clutch diaphragm spring 52 is compressed. The thrust of the clutch piston 52 is used with the clutch diaphragm spring 53 as a lever so as to push the pressure plate 54 to connect the clutch inner plate 55 to the clutch outer plate 56 so that the power transmitted to the front clutch drum 51 is transmitted to the clutch hub 58. In this case, the planetary second sun gear 64 becomes free member as the rear clutch 18 is disengaged, and the input of the planetary low sun gear 63 is engaged with the planetary low pinion 67 rotating integral with the planetary output pinion 69 (by welding with electronic beam from the end surface 75) so as to obtain the 1st speed rear ratio.

The 2nd speed of "D" range is so obtained that the front clutch 14 is disengaged, and the rear clutch 18 is engaged contrary to the above, and accordingly the planetary second sun gear 64 is acted as the input member of the planetary gear device 15, and the planetary low sun gear 63 becomes free member. The forward locking lever 151 and the forward locking gear 82 are engaged similar to the 1st speed, and accordingly the inner race 81 of the one-way clutch is fixed. When the transmission is driven by the engine, since the planetary carriers 61 and 62 receives the clockwise reaction by the input from the planetary second sun gear 64, and accordingly the planetary carriers 61 and 62 integral with the outer race 84 of the one-way clutch 16 is fixed, and the planetary second sun gear 64 is engaged with the planetary second pinion 68 (rotating integrally with the end surface 75 and the planetary output pinion 69), so as to obtain 2nd speed gear ratio.

The 3rd speed of "D" range is so obtained that by simultaneously operating the front clutch 14 and the rear clutch 18, the planetary low sun gear 63 and the planetary second sun gear 64 are locked to the input shaft 13 of the transmission, so as to rotate in the same direction, and accordingly the planetary gear device 15 is fixed overall integral, and rotated counterclockwise seen from the 1st speed reduction gear. In this case, though the forward locking lever 151 and the forward locking gear 82 are engaged, the planetary carrier rotates in a counterclockwise direction, and, accordingly, the outer race 84 of the one-way clutch 16 is rotated in counterclockwise direction to provide 3rd speed gear ratio having 1:1.

In case the "1" or "2" ranges are manually selected the same power transmission as the 1st and 2nd speeds of "D" range is conducted. Therefore, the engagement of the forward locking lever 151 and the forward locking gear 82 is as they are, and in addition, the brake band 17 is actuated, and the outer race 84 of the one-way clutch 16, that is, the planetary carriers 61 and 62 are enforceably fixed. When the transmission is driven from the engine, it is fixed by the one-way clutch 16, and when it is driven from the axle shaft 20, that is when the engine brake is conducted, it is fixed by using the brake band 17.

Therefore, the capacity of the brake band may be enough only to meet the engine brake characteristics, with small capacity enough thereto so as to contribute to the compactness of the transmission, and the adjusting of the brake 17 is not so frequently necessary.

Referring now back to FIG. 3, showing the operation of the brake band 17, the hydraulic pressure is introduced with pipe 119 into the chamber between the cylinder 111 and the piston 112 so as to move the piston 112 against the spring 114. For this reason, since the projection 120 integral with the piston pushes the band lever 115, the band lever 115 rotate around the shaft 118 as a center, so as to push the strut 117. Therefore, since the brake band 17 is pushed by the strut and is fixed with the adjusting screw 116 mounted at the opposite end to the cylinder 111, it is operated so as to fix the outer race 84 of the one-way-clutch 16.

When the "R" range of the transmission is selected, the front clutch 14 is operated so that the input member to the planetary gear device bears the planetary low sun gear 63, and further the reverse locking lever 154 engages with the reverse locking gear 91 integral with the rear clutch drum 92, and accordingly to fix the planetary second sun gear 64.

In this case, the engagement of the forward locking lever 151 and the forward locking gear 82 are disengaged, and the rear clutch 18 is also disengaged. In such state, the planetary gear device 15 provides the planetary low sun gear 63 as input member, the planetary second sun gear 64 as a fixed member, and the planetary carriers 61 and 62 as free members so as to obtain the reverse speed gear ratio with composite rotation.

In "N" range, all the forward locking levers 151, reverse locking lever 154, front clutch 14, rear clutch 18 and brake band 17 are released, so that the power from the engine is not transmitted to the axle shaft 20.

In "P" range, similar to the "N" range, all the forward locking lever 151, reverse locking lever 154, front clutch 14, rear clutch 18, brake band 17 are released, but the parking pole (not shown) fixes the governor driving gear 131, to fix the secondary speed reduction gears 12 and 123, and to fix the axle shaft 20.

According to the present invention, it should be understood from the foregoing description that by adopting special planetary a transmission with three forward and one reverse gear ratios and yet only one one-way clutch has the functions for shifting all the speeds in automatic speed shifting, and accordingly the shock upon speed shifting may be reduced, so as to simplify the hydraulic control mechanism. It should also be understood that the brake band used for the purpose of only fixing the reaction member of the planetary gear device upon engine brake driven from the axle shaft side becomes endurable and advantageous in adjustment.

It should also be understood that since two gear locking mechanisms, in forward and reverse direction, are constructed simply, excessive power loss may be prevented in the oil pump in comparison with the conventional shifting elements using hydraulic pressure.

Though in the description of the present invention it is described as to the automatic transmission as one embodiment having three forward and one reverse gear ratios in front engine, front drive or rear engine, rear drive as shown in FIG. 1, this may also be alternated in another arrangements within the scope of the present invention. For example, by disposing the rear clutch between the front clutch and the planetary gear speed shifting device it may easily obtain the arrangement proper for the front engine, front drive, and by disposing the planetary pinion in series in four rows, the four forward stage of the transmission may also be obtained within the scope of the present invention.

What is claimed is:

1. In an automatic transmission having three forward and one reverse gear ratios including:
   a torque transmitting fluid device coupling said transmission input to a power source,
   a planetary gear speed shifting device,
   forward and reverse locking device,
   front and rear clutches,
   brake band means, and
   an one-way clutch,
   The improvement comprising said planetary gear speed shifting device having (a): three planetary sun gears comprising a first planetary low sun gear, a second planetary second sun gear and a third planetary output sun gear, all mounted coaxially with an input shaft and each having different numbers of teeth thereon, (b): a plurality of planetary pinion gear sets comprising a first planetary low pinion set, a second planetary second pinion set and a third planetary output pinion set which are mounted on a planetary pinion pin coaxially and integrally connected to one another and engaged with said first planetary low sun gear, said second planetary second gear and said third planetary low sun gear respectively, so that said plurality of planetary pinion gear sets may rotate around their respective planetary pinion pins, and (c): planetary carriers supporting said planetary pinion pins and enabling said planetary pinion gear sets to rotate around the axis of said planetary sun gears, wherein the input shaft is connected to said first planetary low sun gear while said planetary carriers are locked by said forward locking device to obtain a normal first reduction speed; for the second reduction speed, the planetary carriers remain locked, and the input shaft is connected to said second planetary second sun gear; by enabling the planetary carriers to rotate, the input shaft is connected to said planetary output sun gear connected to an output shaft to obtain the final normal direct-drive; wherein said input shaft is driven by said torque transmitting fluid device for all gear ratios.

2. The transmission as set forth in the claim 1, wherein said brake band means is used as a device for locking a reaction element of said planetary gear speed shifting device which is used only for an engine brake upon coasting operated from said output shaft side; whereby the normal first and second reduction speed are obtained.

3. The transmission as set forth in claim 1, wherein said forward locking device comprises mechanical locking mechanism composed of a forward locking gear connected to said planetary carrier through a one way clutch, a forward locking lever having a projection on one end to engage the teeth of said locking gear and a cam follower portion on the opposite end, said lever being pivotally supported between its end portions, and a cam means engaging said cam follower portion so as to cause engagement and disengagement of said lever with said locking gear.

4. The transmission as set forth in the claim 1, wherein said reverse locking device comprises mechanical locking mechanism composed of a reverse locking gear connected to said rear clutch, a reverse locking lever having a projection on one end to engage the teeth of said locking gear and a cam follower portion on the opposite end, said lever being pivotally supported between its end portions, and a cam means engaging said cam follower portion so as to cause engagement and disengagement of said lever with said locking gear.

* * * * *